United States Patent [19]

Knetzlstorfer, deceased et al.

[11] 3,990,873

[45] Nov. 9, 1976

[54] PROCESS FOR PULLING LIGHT CONDUCTING FIBERS

[75] Inventors: Anton Knetzlstorfer, deceased, late of Munich, Germany; by Christine Knetzlstorfer, heir, Munich, Germany; by Hans Knetzlstorfer, heir, Schweinfurt, Germany; by Erna Beck, heir, Obertraubing, Germany

[73] Assignee: Siemens Aktiengesellschaft, Berlin & Munich, Germany

[22] Filed: July 8, 1975

[21] Appl. No.: 594,045

[30] Foreign Application Priority Data

July 17, 1974 Germany............................ 2434380

[52] U.S. Cl............................................ 65/2; 65/13; 219/121 LM
[51] Int. Cl.²........................................ C03B 37/02
[58] Field of Search............... 65/4 B, 13, 2, DIG. 7; 219/121 L, 121 LM

[56] References Cited
UNITED STATES PATENTS

| | | |
|---|---|---|
| 2,825,183 | 3/1958 | Riedel.................................... 65/13 |
| 3,521,192 | 7/1970 | DeMaria et al. ................... 65/4 B X |
| 3,711,262 | 1/1973 | Keck et al. .......................... 65/4 B X |
| 3,865,564 | 2/1975 | Jaeger et al........................... 65/13 X |

*Primary Examiner*—Robert L. Lindsay, Jr.
*Attorney, Agent, or Firm*—Hill, Gross, Simpson, Van Santen, Steadman, Chiara & Simpson

[57] ABSTRACT

A process and an apparatus for pulling cladded light conducting fibers from one end of a blank characterized by utilizing a blank having a hollow tubular core with an exterior casing, directing laser radiation, which will be absorbed by the material of the blank, axially along the blank to heat the one end to create a melting zone from which the cladded fiber is pulled. To aid in directing the laser radiation an optical element is mounted on the open end of the tube to move therewith and to aid in concentrating the radiant energy at the melting zone the one end is positioned at a focal point of substantially spherical reflecting surface so that heat radiating therefrom is reflected and concentrated at the melting zone.

8 Claims, 1 Drawing Figure

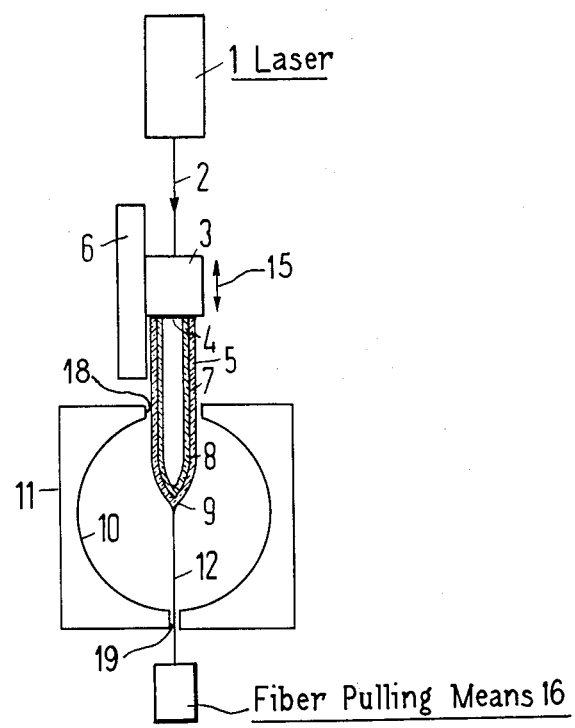

PROCESS FOR PULLING LIGHT CONDUCTING FIBERS

BACKGROUND OF THE INVENTION

The present invention is directed to a process and apparatus for pulling of cladded light conducting fibers from a blank which has a cylindrical cross section with a core and a sheath or casing on an exterior surface of the core.

PRIOR ART

It is known to form light conducting fibers which are provided with a cladding from a blank having a cylindrical cross section with a core and an outer casing or sheath by applying radiant energy adjacent one end of the blank to create a melting zone from which the fiber is pulled by conventional means. Problems occur with the known processes in that the application of radiant heating cannot be controlled to occur only in the melting zone.

SUMMARY OF THE INVENTION

The present invention is directed to a method and apparatus for pulling of light conducting fibers from a blank having a core and sheath in which the radiant heat energy being supplied is virtually all utilized in heating the melting zone of the blank. To accomplish these tasks, the method and apparatus utilize a tubular blank having a hollow tubular core with an outer casing or sheath, said tubular blank has an open end opposite said one end, applying laser radiation which is absorbed by the material of the blank by guiding the laser radiation through the blank to the one end to form a melting zone thereat and pulling the fiber from the melting zone. The temperature at the melting zone of the blank may be controlled by controlling the intensity or power of the laser radiation. Preferably, the laser radiation is directed through an optical element mounted on an open end of the tubular blank to pass axially along the tubular blank to the melting zone.

In the preferred embodiment of the invention, the melting zone is disposed in a reflector housing having a substantially spherical reflecting surface with a focal point and the melting zone is maintained at the focal point so that radiation from the melting zone is reflected by the reflecting surfaces back to the melting zone to concentrate the energy thereat. With the step of concentrating by providing the reflecting surface, the temperature at the melting zone can also be controlled by shifting or displacing the melting zone relative to the focal point of the reflector.

BRIEF DESCRIPTION OF THE DRAWING

The FIGURE is a schematic presentation with portions in cross section of an apparatus for performing the present invention.

DESCRIPTION OF THE PREFERRED EMBODIMENT

The principles of the present invention are particularly useful in performing the method of the present invention with the apparatus illustrated in the FIGURE. The apparatus includes a controllable laser 1 which emits a laser radiation 2 that is focused by an optical element 3 into an open end 4 of a hollow tubular-shaped blank 5. The blank 5 is rigidly connected to the optical element 3, which is connected to a displacement or drive mechanism 6 so that the optical element and blank 5 may be displaced in the direction of the double arrow 15.

The blank 5 comprises a hollow tubular-shaped casing 7 which has an index of refraction which is smaller or lesser than the index of refraction of a likewise hollow tubular-shaped core 8. The blank has one end which is closed and, as illustrated, has a conical shape terminating in a tip 9 from which the cladded optical fiber 12 is pulled by means 16, which can be conventional fiber pulling means.

To concentrate the heat at the melting zone of the closed end and particularly at the tip 9, the blank 5 is inserted through an opening 18 in a reflector housing 11 which has a substantially spherical mirror or reflecting surface 10 with a focal point. The displacement mechanism 6 is utilized as adjustable supporting means to displace the blank 5 and the optical element 3 in a direction of arrow 15 to maintain the tip 9 at the focal point of the mirrors or reflecting surfaces 10.

In using the apparatus, the laser 1 is either $CO_2$ laser or a CO laser, which emits IR radiation that will be absorbed by the materials of the blank 5. The laser radiation 2, as it is guided by the optical element 3 through the open end 4 of the blank 5, is guided to the conically tapering closed melting zone by way of total reflection on the inside wall of the tubular core 8. In this manner, a steady and rotatably symmetric heat supply is guaranteed at the melting zone. The temperature at the melting zone of the blank 5 can be controlled by controlling the intensity or radiated power output of the laser 1.

With the guiding of the radiation axially on the blank 5 to the closed end, the highest temperature will be reached at the tip 9 of the conical end so that the core 8 and casing 7 will fuse at the melting zone and they can be pulled from the tip 9 as the single cladded fiber 12 which passes through a second aperture 19. Any laser radiation passing through the closed end is reflected by the reflecting surfaces 10 and directed back to the melting zone. In addition to laser radiation, any other energy radiation from the melting zone will be reflected back by the reflecting surfaces 10 to the focal point and therefore all other radiation from the tip 9 is concentrated or redirected back at the tip 9. Thus, the temperature at the melting zone can also be controlled by controlling the displacement of the tip 9 from the focal point of the spherical reflecting surface 10 by controlling the drive or displacement mechanism 6.

Since the heat energy supplied from the outside proceeds from the open end 4 of the blank 5 to the closed end, there is practically no loss of heat at the upper end of the blank. Also, due to the fact that the laser radiation is guided by total reflection to the closed end of the blank 5 and is absorbed under multiple reflections by the reflecting surface 10, the highest temperature develops at the melting zone and particularly at the tip 9 from which the fiber is pulled. Due to this phenomenon, problems with heating the end of the blank remote from the melting zone are minimized.

Although various minor modifications might be suggested by those versed in the art, it should be understood that I wish to employ within the scope of the patent granted hereon, all such modifications as reasonably and properly come within the scope of my contribution to the art.

I claim:

1. In a method of pulling a cladded light conducting fiber from one end of a blank having cylindrical cross section and consisting of a core and a casing by radiantly heating the one end of the blank to form a melting zone in the blank and pulling the fiber from the melting zone, the improvements comprising providing a tubular blank having a hollow tubular core with the casing, said tubular blank having an open end opposite said one end, and applying laser radiation, which is absorbed by the material of the blank, by guiding the laser radiation through the blank to said one end.

2. In a method according to claim 1, which includes controlling of the temperature at the melting zone by controlling the intensity of the laser radiation.

3. In a method according to claim 1, which further includes providing a substantially spherical reflector having a focal point, and maintaining said one end at the focal point so that radiant energy given off by the melting zone is reflected back and concentrated at said one end.

4. In a method according to claim 3, which includes controlling the temperature at the melting zone by shifting said one end relative to the focal point of the reflector.

5. In a method according to claim 1, wherein the step of applying the laser radiation comprises directing the laser radiation axially along the hollow blank from the open end to said one end, said step of directing including providing an optical element rigidly attached to said open end for axially directing the laser radiation.

6. In a method according to claim 5, which further includes providing a substantially spherical reflector having a focal point, and positioning said one end of the blank at the focal point so that radiant energy given off by the melting zone is reflected back to said one end.

7. In a method according to claim 6, which includes controlling of the temperature at the melting zone by controlling the intensity of the laser radiation.

8. In a method according to claim 7, which further includes controlling the temperature at the melting zone by shifting the optical element and blank to shift the melting zone relative to the focal point of the reflector.

* * * * *